(12) United States Patent
Kodimer et al.

(10) Patent No.: US 9,357,087 B2
(45) Date of Patent: May 31, 2016

(54) PROVIDING SCAN EXCLUSIVITY TO A MOBILE DEVICE

(71) Applicants: Toshiba Tec Kabushiki Kaisha, Tokyo (JP); Kabushiki Kaisha Toshiba, Tokyo (JP)

(72) Inventors: Marianne Kodimer, Huntington Beach, CA (US); Matthew Hansen, Mount Horeb, WI (US); Sarah Shekher, Santa Barbara, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/286,745

(22) Filed: May 23, 2014

(65) Prior Publication Data
US 2015/0341511 A1    Nov. 26, 2015

(51) Int. Cl.
*H04N 1/00* (2006.01)
*H04N 1/32* (2006.01)

(52) U.S. Cl.
CPC ............. *H04N 1/00307* (2013.01); *H04N 1/00* (2013.01); *H04N 1/32* (2013.01); *H04N 1/32545* (2013.01)

(58) Field of Classification Search
CPC .................. H04N 1/00307; H04N 1/32545
USPC ................................................. 358/1.13–1.17
See application file for complete search history.

(56) References Cited

U.S. PATENT DOCUMENTS

| | | | |
|---|---|---|---|
| 2007/0256020 A1* | 11/2007 | Haga | 715/741 |
| 2012/0062947 A1* | 3/2012 | Shozaki | 358/1.15 |
| 2012/0099146 A1* | 4/2012 | Stokes et al. | 358/1.15 |
| 2013/0021643 A1* | 1/2013 | Nuggehalli et al. | 358/1.15 |
| 2013/0063759 A1* | 3/2013 | Kutoh et al. | 358/1.14 |

\* cited by examiner

*Primary Examiner* — Benny Q Tieu
*Assistant Examiner* — Quyen V Ngo
(74) *Attorney, Agent, or Firm* — SoCal IP Law Group LLP; Steven C. Sereboff; Jonathan Pearce

(57) ABSTRACT

Apparatus and methods for accessing a scanner from a mobile device. A document processing device may include a scanner to perform a scan function on a physical document to generate an electronic document and a controller. The controller may receive a request for a scan session from a first user via a first mobile device and determine, upon receipt of the request, whether or not the scanner is available for use by the first user. Upon a determination that the scanner is available for use by the first user, the controller may establish a locked scan session for the first user. During the duration of the locked scan session, the controller may accept an instruction from the first mobile device to perform a scan and may not accept an instruction to perform a scan from any device other than the first mobile device.

15 Claims, 6 Drawing Sheets

PROVIDING SCAN EXCLUSIVITY TO A MOBILE DEVICE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to performing document processing operations using public and private data sources and output locations.

2. Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as documents, unless the context requires some discussion of physical documents which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document which the MFP has also scanned or from an input electronic document which the MFP has converted to a fax format.

MFPs are often incorporated into corporate or other organization's networks which also include various other workstations, servers and peripherals. An MFP may also provide remote document processing services to external or network devices.

Increasingly, users have access to mobile devices, such as mobile telephones, tablets, and mobile computers, and wish to interact with MFPs that are available to them to accomplish tasks. One such task is using an MFP to scan a physical document, with the resulting electronic document delivered to the mobile device or another storage location designated by the user.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

Performing document processing operations directly from a mobile device enables users to avoid the inconvenience of moving documents from the mobile device to a computer suitably adapted to provide document processing requests to an MFP. In many situations, a user may receive a document at his or her mobile device via email. The user may then wish to print or to fax or store that document in a network or cloud location. In other situations, the user interface and processing powers available to a mobile device may provide a better user experience than is available on an MFP. In addition, a user's mobile device may be with them while taking part in meetings, while in his or her office, while at home, and while far from any MFP.

Figure 6:
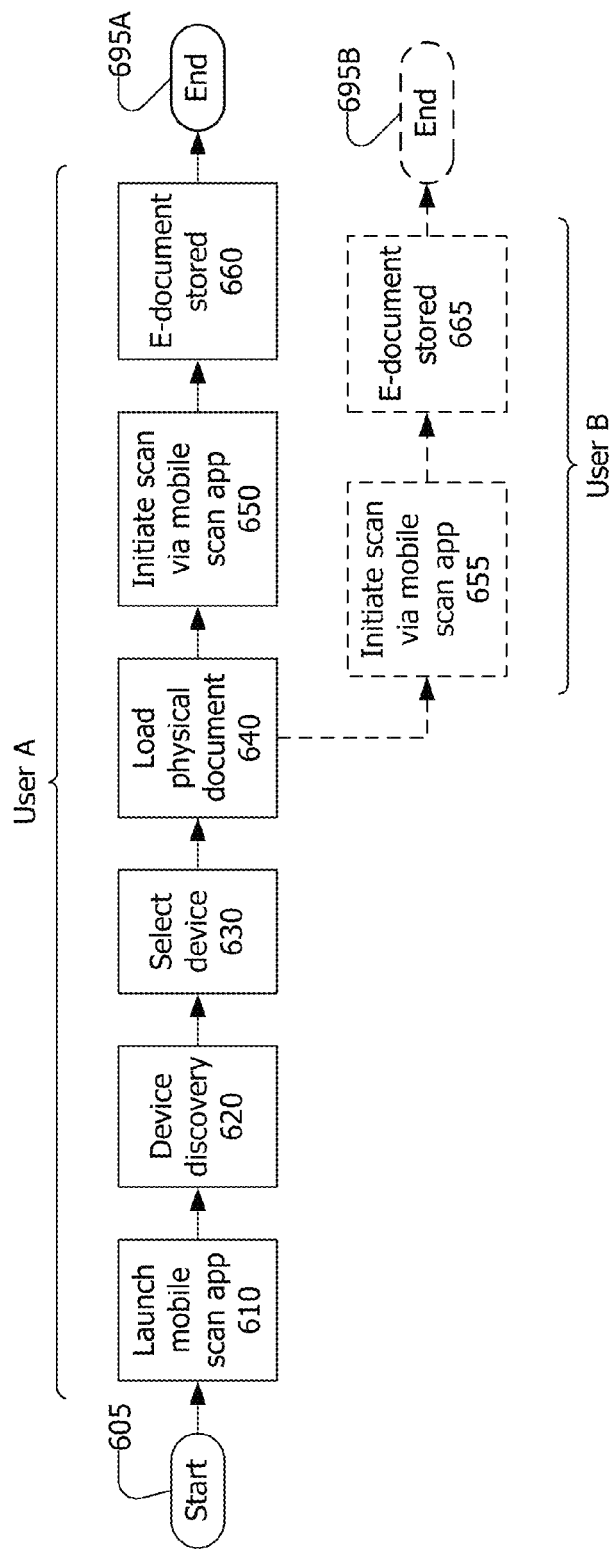
FIG. 6 is a flowchart of a prior art process for scanning a document.

A common task performed by the user of a mobile device is to scan a document into the mobile device, or another storage location designated by the user, using a mobile device scan application (App). A conventional process 600 for scanning from a network MFP to a mobile device is shown in FIG. 6. At 610, User A launches a scan application on the mobile device. From the scan application, User A initiates device discovery to obtain possible target MFP devices at 620. Device discovery may be performed, for example, by accessing a DNS server, by sending a multicast discovery request, or in some other manner. At 630, User A selects a device from the list of discovered devices to serve as the target device. At 640, User A places hard copy document on the target device. At 650, User A initiates scan process from the mobile scan application. At 660, the scanned electronic document (E-document) is received in the mobile device or another document repository designated by User B.

The conventional process 600 is insufficient because another user, User B, could inadvertently or deliberately hijack the scan job during the period after User A loads the physical document at 640 and before User A initiates the scan at 650. Because many users have access to any given networked MFP device, it is possible that both User A and User B could use the same mobile scan application to discover and target the same MFP for scanning. As a result, after User A has placed his/her hard copy document onto the MFP at 640, User B could initiate the scan job from the mobile scan application at 655, with the result the User B receives the scanned document on his own mobile device or at another storage location designated by User B.

Description of Apparatus

Figure 1:
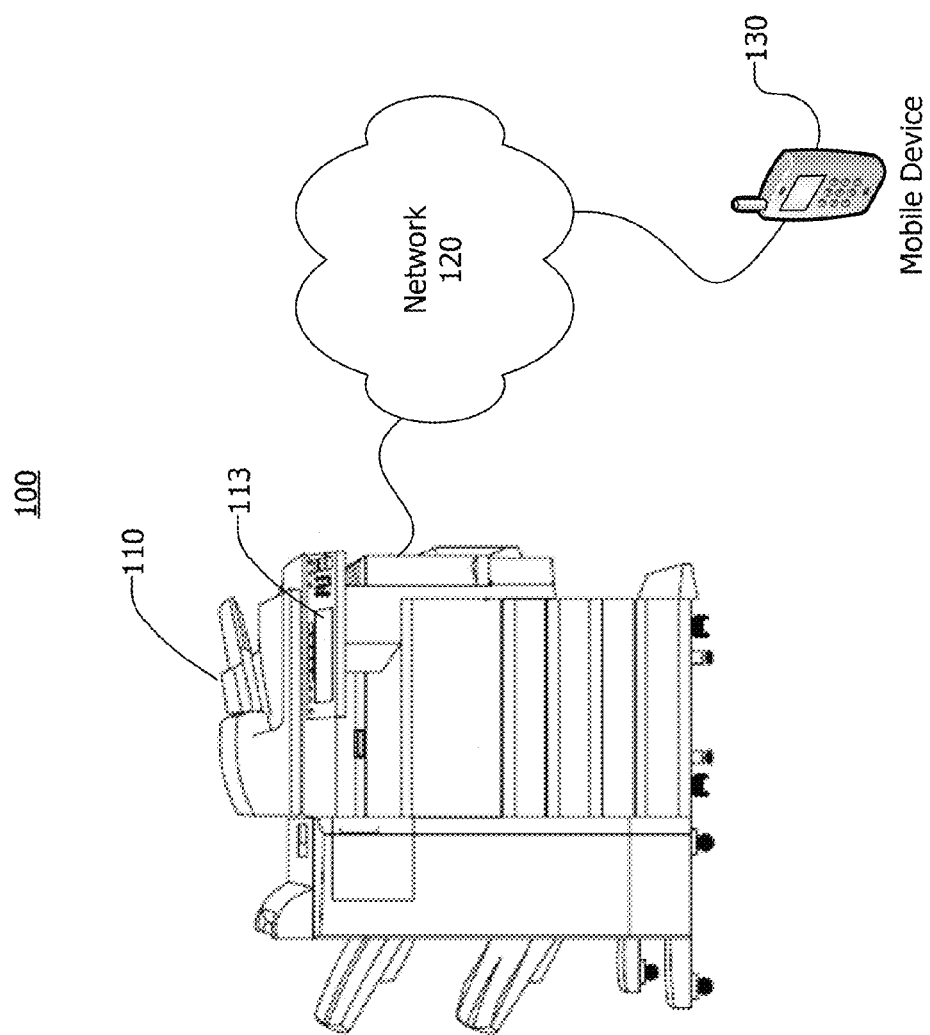
FIG. 1 is a diagram of an MFP system.

Referring now to FIG. 1 there is shown a document processing system 100. The document processing system 100 includes a document processing device 110 and a mobile device 130, interconnected by a network 120. While the document processing device is shown as an MFP, the document processing device may be any networked device having a document scanning function. The document processing system 100 may be implemented in a distributed computing environment and interconnected by the network 120. A document processing system may include more than one document process device and more than one mobile device. A document processing system may include additional devices, such as one or more storage devices or document repositories, not shown in FIG. 1.

The network 120 may be a local area network, a wide area network, a personal area network, a mobile or telephone network, the Internet, an intranet, or any combination of these. The network 120 may have physical layers and transport layers according to IEEE 802.11, Ethernet or other wireless or wire-based communication standards and protocols such as WiMax®, Bluetooth®, mobile telephone and data protocols, the public switched telephone network, a proprietary communications network, infrared, and optical.

The document processing device 110 may be equipped to receive portable storage media such as USB drives. The document processing device 110 includes a user interface subsystem 113, which communicates information to and receives selections from users. The user interface subsystem 113 has a user output device for displaying graphical elements, text data or images to a user and a user input device for receiving user inputs. The user interface subsystem 113 may include a touchscreen, LCD display, touch-panel, alpha-numeric keypad and/or an associated thin client through which a user may interact directly with the document processing device 110.

The mobile device 130 is a mobile or handheld PC, a tablet or smart phone, a feature phone, smart watch, or other similar device. The mobile device 130 is representative of one or more end-user devices and in some cases may not be a part of the document processing system 100.

Figure 2:
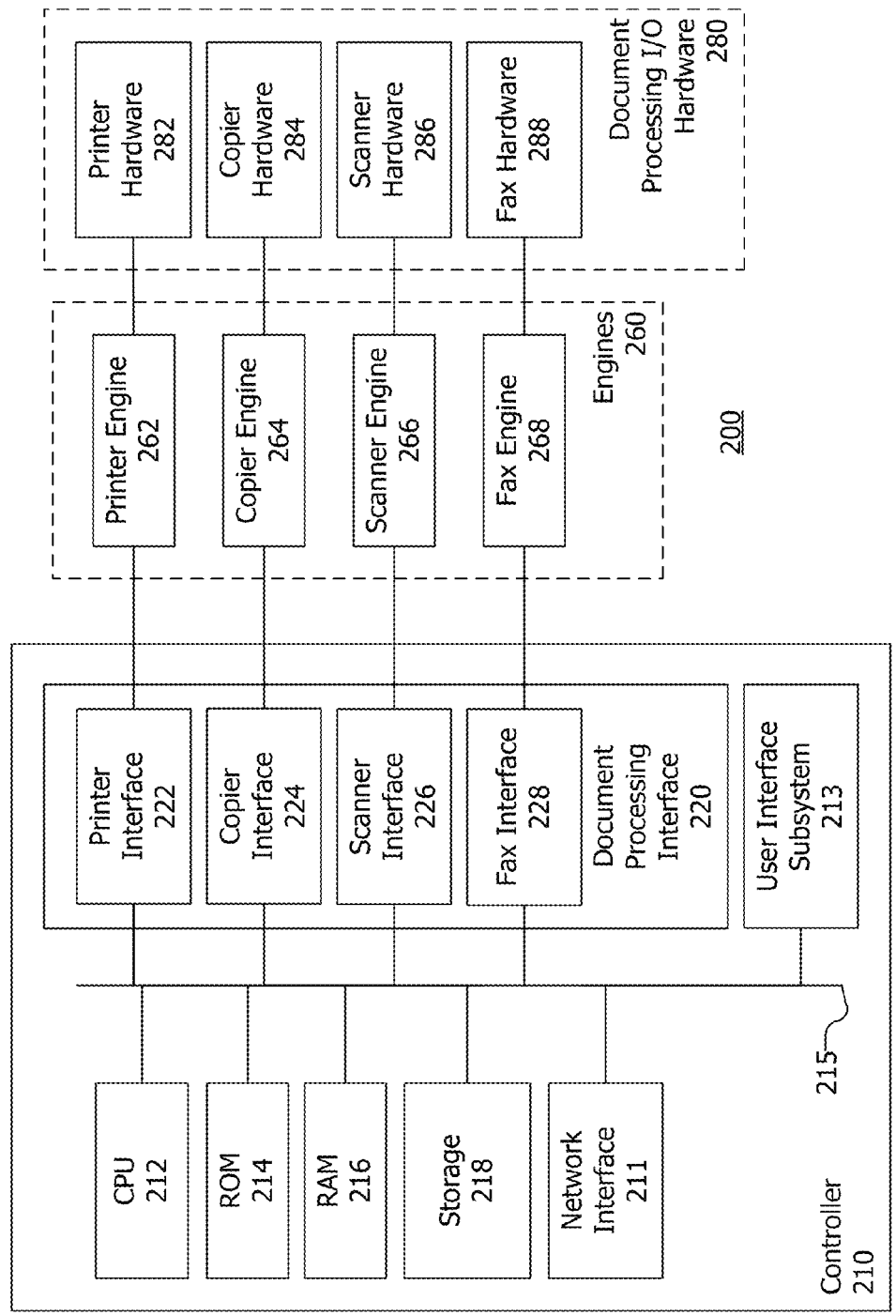
FIG. 2 is a block diagram of an MFP.

Turning now to FIG. 2 there is shown a block diagram of an MFP 200 which may be the document processing device 110 (FIG. 1). The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 120 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously. However, the MFP 200 may be controlled from and provide output to the user interface subsystem 213, which may be the user interface subsystem 113 (FIG. 1).

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions.

Figure 3:
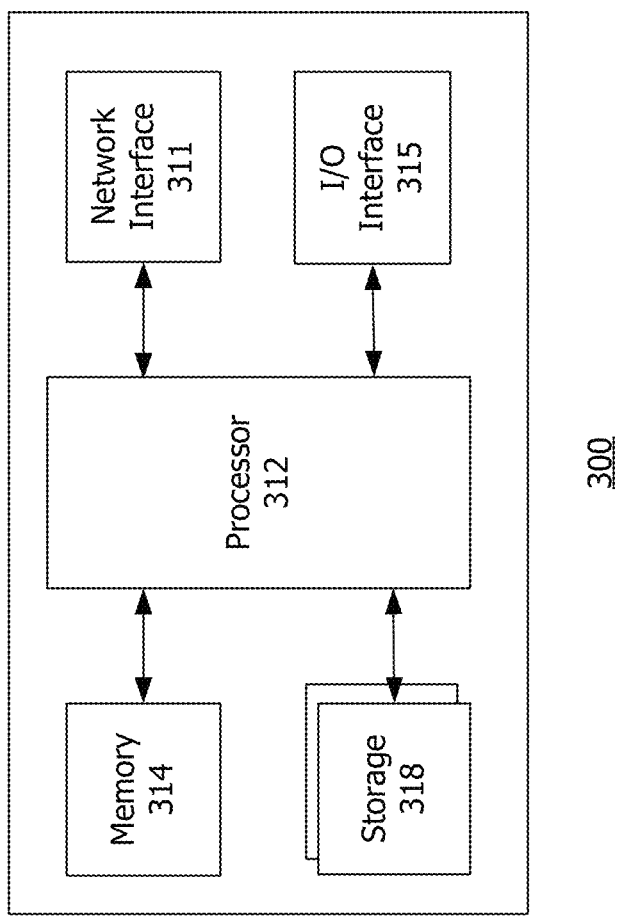
FIG. 3 is a block diagram of a computing device.

Turning now to FIG. 3 there is shown a computing device 300, which is representative of the server computers, client devices, mobile devices and other computing devices discussed herein. The controller 210 (FIG. 2) may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors and, application specific integrated circuits (ASICs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

The network interface 311 includes an interface to a network such as network 120 (FIG. 1).

The I/O interface 315 interfaces the processor 312 to peripherals (not shown) such as displays, keyboards and USB devices.

Figure 4:
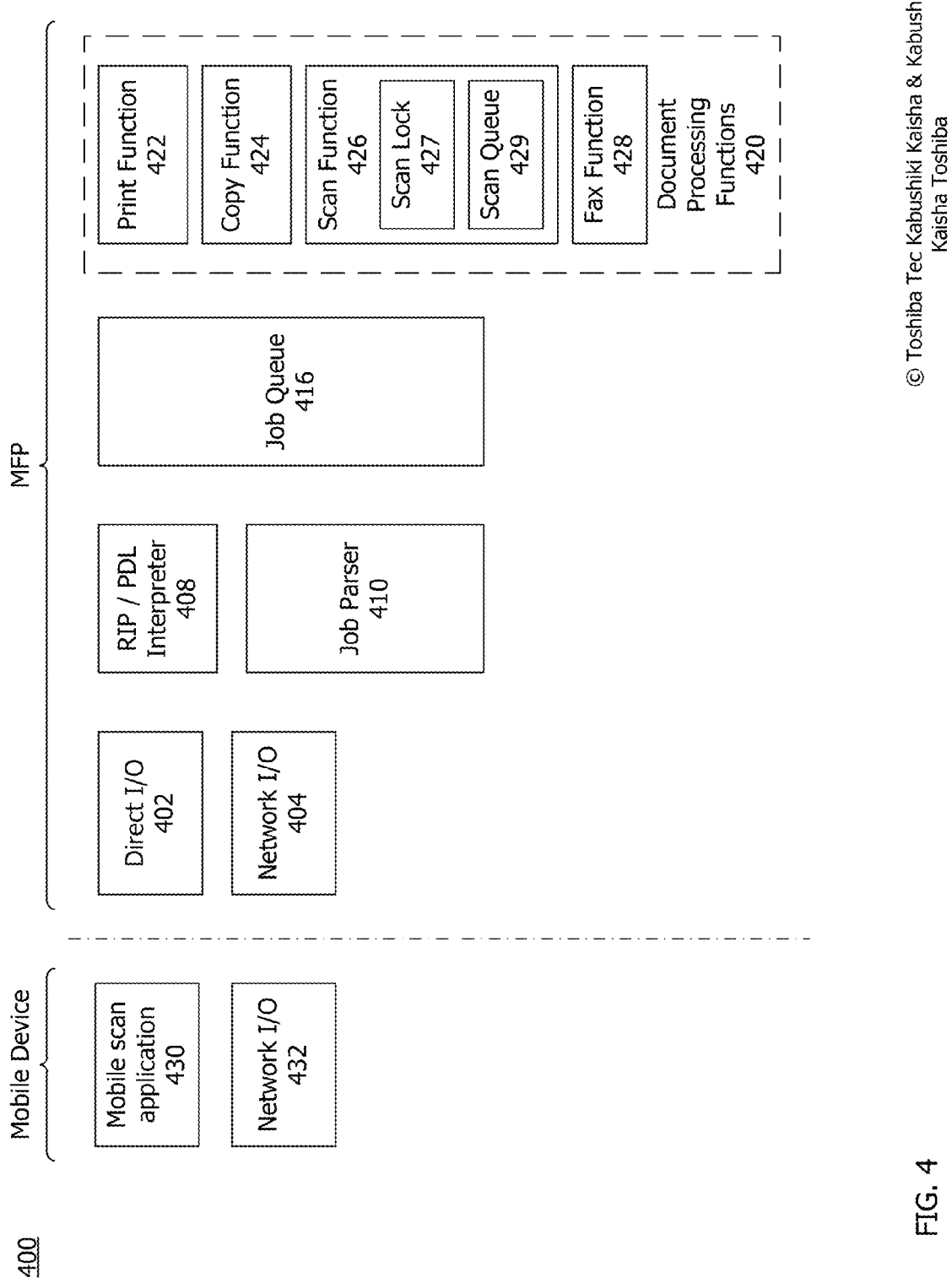
FIG. 4 is a block diagram of a software system for an MFP.

Turning now to FIG. 4 there is shown a block diagram of a software system 400, which includes software element within an MFP (402-429) and software elements within a mobile device (430-432). The software elements within the MFP may operate on the controller 210. The software system 400 includes client direct I/O 402, client network I/O 404, a RIP/PDL interpreter 408, a job parser 410, a job queue 416, a series of document processing functions 420 including a print function 422, a copy function 424, a scan function 426 and a fax function 428.

The client direct I/O 402 and the client network I/O 404 provide input and output to the MFP controller. The client direct I/O 402 is for the user interface on the MFP (e.g., user interface subsystem 113), and the client network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail TELNET or other network communication protocols.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the client network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the client direct I/O 402. The client direct I/O 402 may include printing, fax transmission or other input of a document for handling by the system 400.

The print function 422 enables the MFP to print documents and implements each of the various functions related to that process. These include stapling, collating, hole punching, and similar functions. The copy function 424 enables the MFP to perform copy operations and all related functions such as multiple copies, collating, 2 to 1 page copying or 1 to 2 page copying and similar functions. Similarly, the scan function 426 enables the MFP to scan and to perform all related functions such as shrinking scanned documents, storing the documents on a network or emailing those documents to an email address. The scan function 426 may include or have access to a scan lock function 427 and a scan queue function 429. The scan lock function 427 may reserve the scan function for a particular user, preventing other users from initiating document scans while the scan function is locked. The particular user may be identified by a unique user identification, such as a media access control (MAC) address of an internet protocol (IP) address of the user's mobile device. The scan queue function 429 may maintain a scan queue or list of users waiting to use the scanner but prevented from doing so because the scan function is locked for another user. Upon completion of a locked scan session, the scan queue function 429 may establish a new locked scan session for the user at the head of the scan queue. The fax function 428 enables the MFP to perform facsimile operations and all related functions such as multiple number fax or auto-redial or network-enabled facsimile.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

The software functions of the mobile device include a mobile scan application 430 and a network I/O function 432. The scan application 430 may allows user of the mobile device to initiate and control document scanning performed by the MFP. The mobile scan application 430 may include or have access to a discovery function that allows the mobile device to locate one or more MFPs that are available for scanning documents. The network I/O function 432 may provide input and output functions for the mobile device, including communicating with the MFP using appropriate communications protocols.

Description of Processes

Figure 5:
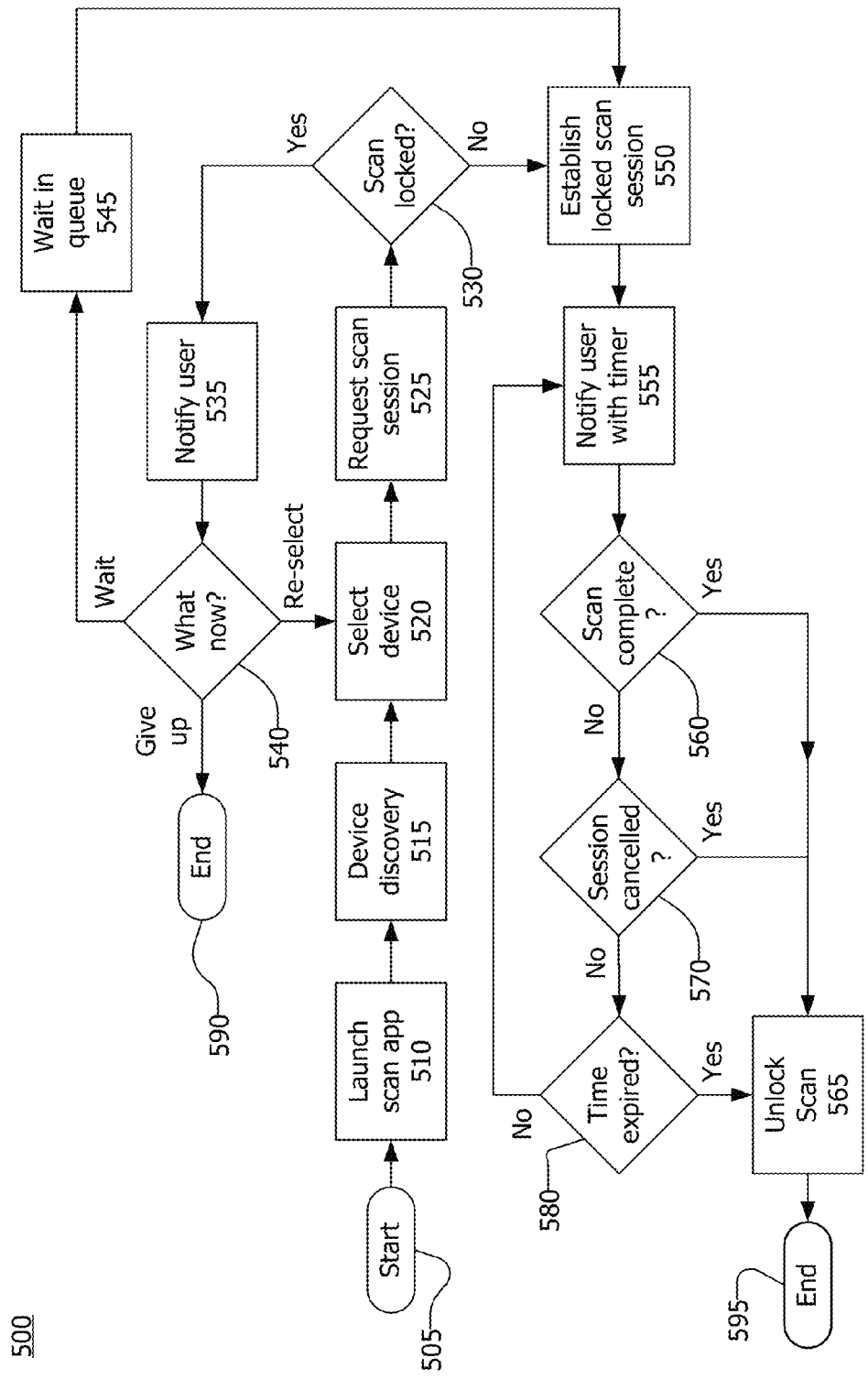
FIG. 5 is a flowchart of a process for scanning a document.

Turning to FIG. 5, a process 500 for scanning a document may start at 505 and end at either 590 or 595. The process 500 may be performed collaboratively by a mobile device, such as the mobile device 130 and a document processing device 110 such as the document processing device 110. Multiple instances of the process 500 may be performed by a single document processing device and a corresponding number of mobile devices, with a limitation that only one instance of the actions from 555 to 595 can exist on a document processing device at any given time.

At 510, User A may launch, or initiate, a scan application on the mobile device. From the scan application, User A may initiate device discovery to obtain possible target document processing devices at 515 as previously described. Alternatively, the scan application, once launched, may automatically initiate device discovery. In either case, the result of the device discovery may be a list of one or more document processing devices that have scan capability and are accessible to the mobile device. At 520, User A may select a device from the list of discovered devices to serve as the target device. At 525, the mobile scan application may send a request for a scan session to the selected document processing device. The request for the scan session may include a unique identifier of the mobile device, such as a MAC (media access control) address or IP (internet protocol) address. At 530, the selected document processing device may determine whether or not its scan function is locked or temporarily reserved for another user, which is to say a user having a unique identifier different from the unique identifier included in the scan session request at 525.

When the scan function is not locked ("no" at 530), a locked scan session may be established by the document processing device at 550. The critical feature of a locked scan session is that the document processing device will only accept an instruction to scan a document from the mobile device with the unique identifier provided at 525. While the locked scan session persists, the document processing device will not accept a scan instruction from another mobile device, the network, or its own user interface. Once a locked scan session is established, the lock scan session will persist until a document scan is completed, the scan session is cancelled, or a predetermined time period has elapsed.

For ease of depiction and discussion, the actions from 555 to 580 are shown in FIG. 5 as sequential acts performed cyclically. These actions may be performed essentially simultaneously and continuously. At 555, the user may be notified that a locked scan session has been established. The user may be notified, for example, by a suitable message or screen displayed on the mobile device. The message or screen may include a timer indicating the remaining portion of the predetermined time period. At 560 a determination may be made whether or not a scan has been completed. At 570, a determination may be made whether or not the scan has been cancelled by the user (i.e. by an instruction from the mobile device with the unique identifier provided at 525) or person (e.g. a network administrator) with authority to cancel a locked scan session. At 580, a determination may be made if the predetermined time period has expired. When the determination is "yes" at any one of 560, 570, and 580, the scan function of the document processing device may be unlocked (i.e. made available to other users) at 565. The process 500 may then end at 595. When the determination is "no" at all of 560, 570, or 580, the actions from 555-580 may be repeated (updating the timer displayed to the user) until a "yes" determination occurs at one of 560, 570, and 580.

When the scan function is locked ("yes" at 530) the user may be informed, for example by a suitable message displayed on the mobile device, at 535. At 540, the scan application may present the user with a list of alternative actions ("what now?"). Possible alternative actions include "re-select", in which case the process 500 returns to 520 to allow the user to select a different document processing device, if available. Alternative actions may also include "wait", in which case the user is added to a queue maintained by the document processing device. The user may wait in the queue at 545 until the document processing device is available. Upon completion of a prior locked scan session, a new locked scan session for the user may be initiated at 550 as previously described. Another alternative action at 540 may be to "give up", in which case the process 500 may end at 590 without a document being scanned.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A document processing device, comprising:
   a scanner to perform a scan function on a physical document to generate an electronic document; and
   a controller coupled to the scanner, the controller configured:
   to receive a request for a scan session from a first user via a first mobile device,
   to determine, upon receipt of the request, whether or not the scanner is available for use by the first user,
   upon a determination that the scanner is available for use by the first user, to establish a locked scan session,
   during the duration of the locked scan session, to accept an instruction from the first mobile device to perform a scan and to not accept an instruction to perform a scan from any device other than the first mobile device; and
   upon a determination that the scanner is not available for use by the first user, to send the first mobile device a message indicating the scanner is performing a locked scan session for a second user and to offer to the first user via the first mobile device an option to select a different document processing device from a list of one or more document processing devices.

2. The document processing device of claim 1, wherein
   the request for a scan session includes a unique identifier of the first mobile device, and
   the controller is further configured to accept the instruction to perform a scan only from a device having the unique identifier during the duration of the locked scan session.

3. The document processing device of claim 2, wherein
   the unique identifier is one or more of a media access control address and an internet protocol address of the first mobile device.

4. The document processing device of claim 1, wherein the controller is further configured to terminate the locked scan session upon one of completion of a scan operation, cancellation of the locked scan session, and expiration of a predetermined time period.

5. The document processing device of claim 1, wherein the controller is further configured to only accept an instruction to terminate the locked scan session from one of the first mobile device and an administrator having authority to cancel a locked scan session.

6. The document processing device of claim 1, wherein the controller is further configured to upon a determination that the scanner is not available for use by the first user, to send a message that the scanner is performing a locked scan session for a second user.

7. The document processing device of claim 6, wherein the controller is further configured to
after sending message that occupied by a locked scan session for a second user, to receive an instruction to add the first user to a queue of users waiting to user the scanner, and
upon termination of the locked scan session for the second user, to establish a new locked scan session for the user at the head of the queue.

8. A method for scanning a document, comprising:
a selected document processing device including a scanner:
receiving a request for a scan session from a first user via a first mobile device,
determining, upon receipt of the request, whether or not the scanner is available for use by the first user,
upon a determination that the scanner is available for use by the first user, establishing a locked scan session,
during the duration of the locked scan session, accepting an instruction from the first mobile device to perform a scan and not accepting an instruction to perform a scan from any device other than the first mobile device, and
upon a determination that the scanner is not available for use by the first user, sending the first mobile device a message indicating the scanner is performing a locked scan session for a second user and offering to the first user via the first mobile device an option to select a different document processing device from a list of one or more document processing devices.

9. The method of claim 8, wherein
the request for a scan session includes a unique identifier of the first mobile device, and
the method further comprising the document processing device accepting the instruction to perform a scan only from a device having the unique identifier during the duration of the locked scan session.

10. The method of claim 9, wherein
the unique identifier is one or more of a media access control address and an internet protocol address of the first mobile device.

11. The method of claim 8, further comprising:
the selected document processing device terminating the locked scan session upon one of completion of a scan operation, cancellation of the locked scan session, and expiration of a predetermined time period.

12. The method of claim 11, further comprising:
the selected document processing device only accepting the instruction to terminate the locked scan session from one of the first mobile device and an administrator having authority to cancel a locked scan session.

13. The method of claim 8, further comprising:
the first mobile device:
presenting the list of one or more document processing devices having scan capability to the first user,
receiving a user selection of one document processing device from the list, and
sending the request for a scan session to the selected document processing device.

14. The method of claim 13, further comprising:
the first mobile device:
upon receipt of the message indicating the scanner is locked for use by a second user, offering the first user an option to be placed in a queue of users waiting to use the scanner at the first document processing device, and
upon receipt of a user election to join the queue, send a request to join the queue to the first document processing device; and
the first document processing device:
receiving the instruction to add the first user to the queue, and
upon termination of the locked scan session for the second user, establishing a new locked scan session for the user at the head of the queue.

15. A method for scanning a document, comprising:
a first mobile device:
presenting a list of one or more document processing devices having scan capability to the first user,
receiving a user selection of one document processing device from the list, and
sending the request for a scan session to the selected document processing device,
upon receipt of the message indicating the scanner is locked for use by a second user, the first mobile device offering the first user an option to select a different document processing device from the list of one or more document processing devices, and
the selected document processing device including a scanner:
receiving a request for a scan session from a first user via a first mobile device,
determining, upon receipt of the request, whether or not the scanner is available for use by the first user,
upon a determination that the scanner is available for use by the first user, establishing a locked scan session,
during the duration of the locked scan session, accepting an instruction from the first mobile device to perform a scan and not accepting an instruction to perform a scan from any device other than the first mobile device, and
upon a determination that the scanner is not available for use by the first user, the document processing device sending the first mobile device a message indicating the scanner is performing a locked scan session for a second user.

\* \* \* \* \*